United States Patent
Korhonen et al.

(10) Patent No.: US 10,159,100 B2
(45) Date of Patent: Dec. 18, 2018

(54) MECHANISM FOR ESTABLISHING PACKET DATA NETWORK CONNECTION WITH MULTIPLE IP ADDRESSES

(71) Applicant: NOKIA SIEMENS NETWORKS OY, Espoo (FI)

(72) Inventors: Jouni Korhonen, Riihimäki (FI); Teemu Savolainen, Nokia (FI); Gyorgy Tamas Wolfner, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 192 days.

(21) Appl. No.: 14/431,979

(22) PCT Filed: Sep. 28, 2012

(86) PCT No.: PCT/EP2012/069255
§ 371 (c)(1),
(2) Date: Mar. 27, 2015

(87) PCT Pub. No.: WO2014/048499
PCT Pub. Date: Apr. 3, 2014

(65) Prior Publication Data
US 2015/0215971 A1 Jul. 30, 2015

(51) Int. Cl.
*H04W 76/10* (2018.01)
*H04L 29/06* (2006.01)
(Continued)

(52) U.S. Cl.
CPC .......... *H04W 76/10* (2018.02); *H04L 69/167* (2013.01); *H04W 76/12* (2018.02); *H04L 61/2007* (2013.01); *H04W 76/11* (2018.02)

(58) Field of Classification Search
CPC .................................................. H04W 8/082
See application file for complete search history.

(56) References Cited

U.S. PATENT DOCUMENTS

2002/0114326 A1* 8/2002 Mahalingaiah ..... H04L 12/4604
370/389
2004/0148428 A1* 7/2004 Tsirtsis .................. H04W 80/04
709/238
(Continued)

FOREIGN PATENT DOCUMENTS

WO  WO 2013/083189 A1  6/2013

OTHER PUBLICATIONS

International Search Report and Written Opinion dated Jul. 22, 2013 corresponding to International Patent Application No. PCT/EP2012/069255.
(Continued)

*Primary Examiner* — Huy D Vu
*Assistant Examiner* — Kevin Cunningham
(74) *Attorney, Agent, or Firm* — Squire Patton Boggs (US) LLP

(57) ABSTRACT

There is provided a mechanism for establishing a single PDN connection with plural IP addresses and breakout or terminating points. When a communication connection provided with multiple IP addresses via a multi-address bearer connection is established, an indication is prepared for indicating a terminating point represented by a network element of the cellular communication network where data traffic, based on one of the multiple IP addresses, is branched to another network being different to the cellular communication network by means of an IP based communication link The indication element is sent to the communication network by means of a PDCP signaling e.g. as a new PDU type code. In the network, it is decided whether a local receiving network element is indicated as a terminating point, wherein in this case a breakout connection to another network being different to the cellular communication network by the IP based communication link is established.

26 Claims, 7 Drawing Sheets

(51) Int. Cl.
*H04W 76/12* (2018.01)
*H04L 29/12* (2006.01)
*H04W 76/11* (2018.01)

(56) References Cited

U.S. PATENT DOCUMENTS

| | | |
|---|---|---|
| 2008/0285492 A1 | 11/2008 | Vesterinen |
| 2011/0110378 A1* | 5/2011 | Savolainen ......... H04W 76/025 370/400 |
| 2011/0176531 A1 | 7/2011 | Rune et al. |
| 2011/0185049 A1* | 7/2011 | Atreya ................. H04W 12/08 709/222 |
| 2011/0235595 A1* | 9/2011 | Mehta ................... H04W 8/082 370/329 |
| 2015/0055571 A1* | 2/2015 | Vesterinen .......... H04L 61/2092 370/329 |

OTHER PUBLICATIONS

IEEE Standard for Local and metropolitan area networks—Part 15.4: Low-Rate Wireless Personal Area Networks (LR-WPANs), IEEE Computer Society, IEEE Std 802.15.4TM-2011 (Revision of IEEE Std 802.15.4-2006), Sep. 5, 2011, 314 pages.
3GPP TS 23.401 V11.3.0 (Sep. 2012), Technical Specification, 3rd Generation Partnership Project; Technical Specification Group Services and System Aspects; General Packet Radio Service (GPRS) enhancements for Evolved Universal Terrestrial Radio Access Network (E-UTRAN) Access (Release 11), Sep. 2012, 283 pages.
R. Draves et al., "Default Router Preferences and More-Specific Routes," Network Working Group, RFC 4191, Nov. 2005, 14 pages.

* cited by examiner

| PDU Type | EUI-64 identifier | Remarks |
|---|---|---|
| 000b | none | Existing type for control PDUs. |
| 001b | aa:bb:cc:01:00:xx:xx:xx | PGW terminated traffic using existing PDU type space. |
| 010b | aa:bb:cc:02:00:xx:xx:xx | eNB terminated traffic, new PDU type value 2. |
| 011b | aa:bb:cc:03:00:xx:xx:xx | SGW terminated traffic, new PDU type value 3. |
| 100b | aa:bb:cc:33:00:xx:xx:xx | UL multicast traffic, will reach eNB, SGW, PGW, new PDU type . |
| - | aa:bb:cc:05:00:xx:xx:xx | Reserved for mobile devices, not really needed. |

Fig. 2

MECHANISM FOR ESTABLISHING PACKET DATA NETWORK CONNECTION WITH MULTIPLE IP ADDRESSES

BACKGROUND OF THE INVENTION

Field of the Invention

The present invention relates to a mechanism for establishing a packet data network connection provided with plural IP addresses. Specifically, the present invention is related to an apparatus, a method and a computer program product which enable to add multiple IP addresses, such as multiple IPv6 prefixes, into a single PDN connection, and to break out IP links from network elements being different to a packet data network gateway or the like.

Related Background Art

Prior art which is related to this technical field can e.g. be found in technical specifications according to 3GPP TS 23.401 (e.g. version 11.3.0).

The following meanings for the abbreviations used in this specification apply:

APN: access point name
BS: base station
CN: core network
CPU: central processing unit
eNB: evolved node B
EPS: enhanced packet system
EUI-64: extended unique identifier 64 bit
ID: identification
IP: Internet protocol
LI PA: local IP access
LLA: link layer address
LTE: Long Term Evolution
LTE-A: LTE Advanced
MME: mobility management entity
NBMA: non-broadcast multiple access
OUI: organizationally unique identifier
PCC: policy and charge control
PDCP: packet data convergence protocol
PDN: packet data network
PDU: packet data unit
PGW: packet date network gateway
RA: radio access
RAB: radio access bearer
E-RAB evolved radio access bearer
RAN: radio access network
RF: radio frequency
SAE: system architecture evolution
SGW: serving gateway
SGSN: serving GPRS support node
SIPTO: selective IP traffic offloading
UE: user equipment
UI: user interface
USB: universal serial bus
WLAN: wireless local area network In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between terminal devices such as a user equipment (UE) and another communication network element or user equipment, a database, a server, etc., one or more intermediate network elements such as communication network control elements, such as base transceiver stations, control nodes, support nodes or service nodes are involved which may belong to different communication network.

In recent communication systems, the ability to communicate not only via one communication network, such as a cellular communication network of which the user of an UE is subscriber, but also via other communication networks having e.g. an IP based access, such as a WLAN or the like, is a common demand.

For example, in 3GPP based communication networks, such as a 3GPP Evolved Packet System (EPS), the bearer and connectivity model from the IP point of view has remained unchanged practically since the birth of General Packet Radio Service (GPRS). That is, the connectivity model boils down to a handful of technical and architectural assumptions, which have remained untouched. The IP connectivity between the mobile device and the network is realized using a point-to-point mimicking link, where the mobile device is assigned with a single /32 IPv4 address and/or a single /64 IPv6 prefix on a single network interface. For a new IP address, an additional connection between the mobile device and the network has to be created, essentially turning the mobile device to a multi-homed host.

Each connection and a connectivity service is always identified by an APN, which in practice names a gateway node such as the PGW providing access to an external Packet Data Networks (PDN), such as the Internet or an (local) operator services network. The gateway node is located in the mobile operator core network (home or visited) and anchors the mobile device and its connection both mobility and IP topology wise. The gateway node also has the function of the first-hop router for the mobile device.

The present connectivity model is working properly in particular when IPv4 was the only realistic IP version and mobile devices were feature phones with a single radio access technology, a limited openness to IP stack for applications and a top down approach for IP connectivity. Applications control the activation of network resources and have a build-in knowledge of what kind of network access they needed (APNs, IP versions and alike).

However, with the emergence of so-called smart phones with a bottom up approach for IP connectivity and the emerging need to solve the practical challenges of multiple network access interfaces on consumer mobile devices, the traditional 3GPP bearer and connectivity model is not optimal anymore.

SUMMARY OF THE INVENTION

It is an object of the invention to provide an enhanced mechanism for establishing a PDN connection with plural IP addresses. Specifically, it is an object of the invention to provide an apparatus, a method and a computer program product which enable to add multiple IP addresses, such as multiple IPv6 prefixes, into a single PDN connection, and to break out IP links from network elements being different to a PGW or the like.

These objects are achieved by the measures defined in the attached claims. According to an example of an embodiment of the proposed solution, there is provided, for example, a method comprising preparing establishment of a communication connection to a cellular communication network via a multi-address bearer connection, the communication connection is provided with multiple addresses for Internet protocol based communication links, generating an indication element for indicating at least one terminating point represented by a network element of the cellular communication network where data traffic, based on at least one of the multiple addresses, is branched to another network being different to the cellular communication network by means of one of the Internet protocol based communication links, and causing transmission of the indication element by means of a convergence protocol signaling to a communication network control element of the cellular communication network.

Furthermore, according to some examples of embodiments of the proposed solution, there is provided, for example, an apparatus comprising at least one processor, at least one interface to at least one other network element, and at least one memory for storing instructions to be executed by the processor, wherein the at least one memory and the instructions are configured to, with the at least one processor, cause the apparatus at least to perform: an establishment preparation function configured to prepare the establishment of a communication connection to a cellular communication network via a multi-address bearer connection, the communication connection is provided with multiple addresses for Internet protocol based communication links, an indication generation function configured to generate an indication element for indicating at least one terminating point represented by a network element of the cellular communication network where data traffic, based on at least one of the multiple addresses, is branched to another network being different to the cellular communication network by means of one of the Internet protocol based communication links, and a transmission function configured to cause transmission of the indication element by means of a convergence protocol signaling to a communication network control element of the cellular communication network.

According to further refinements, these examples may comprise one or more of the following features:
the Internet protocol based communication links may be IPv6 links, and the addresses for the Internet protocol based communication links may be IPv6 prefixes;
the convergence protocol may be a packet data convergence protocol used between a communication element and a communication network control element, and the indication element may be a packet data unit type code element, wherein a specific packet data unit type code element may be allocated to each possible network element representing a terminating point of the Internet protocol based communication links on the side of the cellular communication network;
mapping of the packet data unit type code element to a link layer address allocated to one of the Internet protocol based communication links may be conducted, or a common link layer addressing may be used for each network element involved in the communication connection via the multi-address bearer connection;
mapping of the link layer address to which the packet data unit type code is mapped to a reserved extended unique identifier may be executed;
information indicating a preferred terminating point for a data communication using the Internet protocol based communication links may be received, wherein the preferred terminating point may be considered in the preparation of the indication element;
the information indicating the preferred terminating point may be derived from a user input via a user interface providing selection options for entering an instruction indicating the preferred terminating point, and/or the information indicating the preferred terminating point may be received from the cellular communication network via an Internet protocol based signaling;
the above described measures may be implemented in a communication element comprising at least one of a terminal device or user equipment which is located in the cellular communication network and which communicates with a communication network control element of the cellular communication network, wherein the communication network control element may comprise at least one of a base station of a cellular network, an evolved node B of a Long Term Evolution or Long Term Evolution Advanced communication network, and wherein the communication element network element representing the terminating point may comprise at least one of the communication network control element and a core network control element including a gateway network element of the cellular communication network.

In addition, according to some examples of embodiments of the proposed solution, there is provided, for example, a method comprising participating in an establishment of a communication connection in a cellular communication network via a multi-address bearer connection to a communication element, the communication connection is provided with multiple addresses for Internet protocol based communication links, receiving, by means of a convergence protocol signaling, and processing an indication element for indicating at least one terminating point represented by a network element of the cellular communication network where data traffic, based on at least one of the multiple addresses, is branched to another network being different to the cellular communication network by means of one of the Internet protocol based communication links, and deciding on the basis of the processing of the indication element whether a local network element is indicated as a terminating point.

Furthermore, according to some examples of embodiments of the proposed solution, there is provided, for example, an apparatus comprising 25. An apparatus comprising at least one processor, at least one interface to at least one other network element, and at least one memory for storing instructions to be executed by the processor, wherein the at least one memory and the instructions are configured to, with the at least one processor, cause the apparatus at least to perform: a processing function configured to conduct processing for participating in an establishment of a communication connection in a cellular communication network via a multi-address bearer connection to a communication element, the communication connection is provided with multiple addresses for Internet protocol based communication links, an indication receiving function configured to receive, by means of a convergence protocol signaling, and process an indication element for indicating at least one terminating point represented by a network element of the cellular communication network where data traffic, based on at least one of the multiple addresses, is branched to another network being different to the cellular communication network by means of one of the Internet protocol based communication links, and a decision function configured to decide on the basis of the processing of the indication element whether a local network element is indicated as a terminating point.

According to further refinements, these examples may comprise one or more of the following features:

if the decision results in that the local network element is indicated as a terminating point, establishment of a breakout connection or usage of established breakout connection to another network being different to the cellular communication network by an Internet protocol based communication link using one of the multiple addresses may be caused, and if the decision results in that the local network element is not indicated as a terminating point or a multicast traffic is indicated, forwarding of the indication element to a network element of the communication network may be caused;

the Internet protocol based communication links may be IPv6 links, and the addresses for the Internet protocol based communication links may be IPv6 prefixes;

the convergence protocol may be a packet data convergence protocol used between a communication element and a communication network control element, and the indication element may be a packet data unit type code element, wherein a specific packet data unit type code element may be allocated to each possible network element representing a terminating point of the Internet protocol based communication links on the side of the cellular communication network;

the packet data unit type code element may be mapped to a link layer address allocated to one of the Internet protocol based communication links, or a common link layer addressing may be used for each network element involved in the communication connection via the multi-address bearer connection;

the link layer address, to which the packet data unit type code is mapped, may be mapped to a reserved extended unique identifier;

transmission of information may be caused to the communication element indicating a preferred terminating point for a data communicating using the Internet protocol based communication links;

the above described measures may be implemented in at least one of a communication network control element comprising at least one of a base station of a cellular network, an evolved node B of a Long Term Evolution or Long Term Evolution Advanced communication network, and a core network control element comprising a gateway network element, wherein the communication element may comprise at least one of a terminal device or user equipment which is located in the cellular communication network and which communicates with the communication network control element of the cellular communication network.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide an improved mechanism usable for establishing a PDN connection provided with plural IP addresses, i.e. to add multiple IP addresses, such as multiple IPv6 prefixes, into a single PDN connection, and to break out IP links from desired network elements being different to a PGW or the like. This can be achieved while causing minimal impact on the radio modem side, i.e. there are no radio changes necessary.

Furthermore, backward compatibility is ensured. That is, while at least some examples of embodiments of the invention are related to the usage of Ipv6 prefixes and link, it is still possible to ensure that IPv4 links and dedicated bearers continue working as in conventional systems, for example as a connection conducted between UE and PGW. In other words, the usage of still existing default bearer/PDN connection that is anchored at the PGW is possible without limitation.

In addition, some examples of embodiments of the invention are advantageous for so-called split-UE scenarios, such as USB dongles, MiFi (My-WiFi) equipment, or even for implementations where a handset is internally architectured as split-UE (separated mobile terminal and terminal equipment), since the usage of e.g. EUI-64 link-layer address is suitable for such a scenario.

Moreover, on the network side, an efficient traffic identification and separation is possible at the communication network control element, such as an access controller or eNB, since an identification/categorization of the connection to be established into one where a breakout connection is to be established or one which concerns another network element (and hence the connection parameters are to be forwarded to it) can be done with minimal processing load. For example, since no IP lookup or inspection is required on the eNB side, the impact on the eNB implementation is kept small.

Also the load for the remaining network elements (i.e. elements being not the local terminating point) can be kept small. For example, in case a breakout connection is to be established at the eNB site, i.e. there is a local IPv6 prefix at the eNB area, the rest of the 3GPP system, such as CN elements like gateway nodes and MME is not involved. That is, the breakout IP link is local to eNB.

Also in case a breakout connection is to be established at the SGW site, i.e. there is a local IPv6 prefix at the SGW, the load for the system can be kept small. The local prefix at the SGW can be seen as mobility management less prefix without burden of PCC and other handover signaling.

Furthermore, it is possible to flexibly configure the system. For example, an operator can decide which network element is to be preferred as a terminating point for a breakout connection. Thus, it is possible, for example, to give the eNB priority compared to other elements (e.g. for traffic offloading reasons), to determine that an SGW provided local addressing is not to be used (configuration as priority level 0, for example).

The above and still further objects, features and advantages of the invention will become more apparent upon referring to the description and the accompanying drawings.

BRIEF DESCRIPTION OF THE DRAWINGS

FIG. 2 shows a diagram illustrating an example of a mapping of PDCP PDU types to EUI-64 identifiers according to some examples of embodiments of the invention.

DESCRIPTION OF PREFERRED EMBODIMENTS

Figure 1:
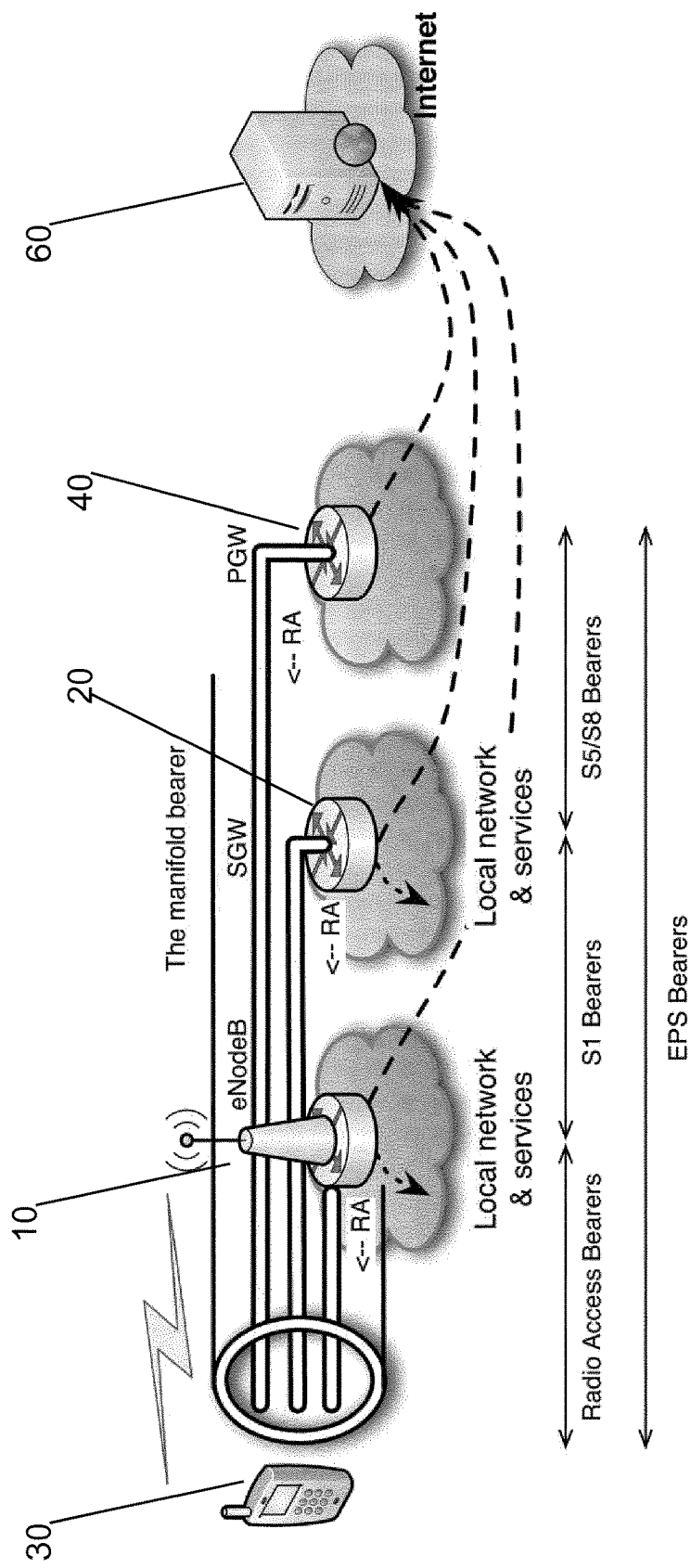
FIG. 1 shows a diagram illustrating a communication network configuration where some examples of embodiments of the invention are implemented.

In the following, examples and embodiments of the present invention are described with reference to the drawings. For illustrating the present invention, the examples and embodiments will be described in connection with a cellular communication network based on a 3GPP based communication system, for example an LTE based system. However, it is to be noted that the present invention is not limited to an application using such a communication system, but is also applicable in other types of communication systems and the like.

A basic system architecture of a communication network where examples of embodiments of the invention are applicable may comprise a commonly known architecture of one or more communication systems comprising a wired or wireless access network subsystem and a core network. Such an architecture may comprise one or more access network control elements, radio access network elements, access service network gateways or base transceiver stations, such as a base station or eNB, which control a coverage area also referred to as a cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network via a communication network control element like a base transceiver station, eNB, etc. besides those described in detail herein below.

Furthermore, the described network elements, such as terminal devices like UEs, communication network control elements like an eNB, core network control elements like an SGW or PGW, and the like, as well as corresponding functions as described herein may be implemented by software, e.g. by a computer program product for a computer, and/or by hardware. In any case, for executing their respective functions, correspondingly used devices, nodes or network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy disc, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

As described above, in conventional examples, APNs are used to identify connections. However, the use of APNs has turned out to be conceptually challenging for bottom up IP connectivity, since applications have less control on activating network connectivity. That is, enabling services and access isolation using multiple network connections has a cost. For example, in case of a 3GPP based network, each 3GPP bearer and connection consumes both radio network and CN resources that are typically a subject to licensing. An equivalent functionality could be accomplished by just allowing multiple addresses (beyond dual-stack) on a single network interface. However, there is an emerging desire to provide shortcuts or breakout connections e.g. to the Internet for certain IP traffic bypassing parts of the operator infrastructure.

According to comparative examples, one approach is to use multiple interfaces, which in cellular only access case leads, for example, to an activation of a specialized bearer. Examples for such an approach are e.g. LIPA or SIPTO bearer for IP traffic. Other approaches according to comparative examples require, for example, multiple RABs, additional signaling, and the involvement of management elements such as MME/SGSN for providing truly local addresses that come from e.g. the eNB. Furthermore, support of multiple parallel PDN connections to different APNs requires also complex processing on the UE side, for example due to provisioning and connection management. Furthermore, measures like IP packet inspection at the eNB/SGW level are necessary, which leads to a decreased performance. Moreover, in 3GPP networks, the conventional methods require to establish a new default bearer, which is costly.

According to some examples of embodiments of the invention, a new bearer and connectivity model is implemented, which advocates multiple addressing on a single PDN network connection. In other words, according to some examples of embodiments of the invention, the usage of multiple APNs can be avoided or at least reduced. In addition, according to some examples of embodiments of the invention, a new link type for e.g. 3GPP based communication is provided which essentially replaces the conventional point-to-point link into a Non-Broadcast Multiple Access (NBMA) resembling link that allows for multiple exit or terminating points for IP connections in the operator IP network infrastructure. According to some examples of embodiments of the invention, the proposed bearer and connectivity model is referred to as a multi-address bearer (also referred to as manifold bearer). According to some examples of embodiments of the invention, the multi address bearer is implemented, for example, in the 3GPP EPS, wherein traffic offloading from the 3GPP network is one goal.

With regard to FIG. 1, a diagram illustrating a general configuration of a communication network is shown where examples of embodiments of the invention are implemented, wherein the basic structure of the multi-address bearer (or manifold bearer) is illustrated. It is to be noted that the configuration shown in FIG. 1 shows only those devices, network elements and parts which are useful for understanding principles underlying the examples of embodiments of the invention. As also known by those skilled in the art there may be several other network elements or devices involved in a communication between the communication device (UE) and the network which are omitted here for the sake of simplicity.

In FIG. 1, a communication network configuration is illustrated in which examples of embodiments of the invention are implementable. The network according to FIG. 1 is for example based on 3GPP EPS specifications. It is to be noted that the general functions of the elements described in connection with FIG. 1 as well as of reference points/interfaces there between are known to those skilled in the art so that a detailed description thereof is omitted here for the sake of simplicity.

As shown in FIG. 1, in the exemplary communication network, a communication element or UE 30 establishes a multi-address bearer to communicate with a cellular communication network comprising, for example, a communication network control element like a eNB 10 providing a radio access for the UE 30 to the network, a serving gateway element such as an SGW 20, and a packet data network gateway element such as a PGW 40. As indicated in FIG. 1, between the respective elements, certain types of EPS bearers are established, such as radio access bearers, S1 bearers, and S5/S8 bearers. With regard to the multi-address bearer, IP links (indicated by dashed arrows in FIG. 1) to the Internet (i.e. a server 60 or the like) or to local networks and services can be established, wherein the eNB 10, the SGW 20 and the PGW 40 are usable as corresponding terminating or exit points for traffic which is received from and forwarded to the radio access (RA) towards the UE 30.

It is to be noted that backwards compatibility is ensured according to some examples of embodiments of the invention since the multi-address bearer model as indicated in FIG. 1 is incremental to the existing 3GPP EPS structure with a fallback possibility to bearer types available in the current EPS. According to some examples of embodiments of the invention, the multi-address bearer connection scheme is usable with IPv6, for example, since IPv6 is especially designed for multi-addressing. However, IPv4 addressing and links can be used in parallel to the bearer and connectivity model provided by the multi-address bearer.

In other words, according to some examples of embodiments of the invention, multiple addresses such as IPv6 prefixes are added into a single PDN Connection. These additional prefixes originate from one of the network elements of the communication network, such as from the eNB 10 or the SGW 20, and establish an IP based connection to another network such a local network or the Internet. Thus, according to some examples of embodiments of the invention, an activation of multiple default bearers and E-RABs is avoided while multiple IPv6 prefixes over a single PDN connection are enabled. That is, the additional prefixes are not supposed to be routed to the PGW (as a conventional exit point to external or other networks such as the Internet), but corresponding IP links are leaked/broken out as breakout connections at an "earlier" point in the network (e.g. from the radio access network). Furthermore, according to some examples of embodiments of the invention, the identification of IP flows is performed without inspecting the IP layer but lower layer identifiers (e.g. link layer, described later) which allows for a better forwarding performance.

According to some examples of embodiments of the invention, for the multi-address bearer IP traffic flow identification/tagging, a solution is used which is based on a convergence protocol signaling. Specifically, the Packet Data Convergence Protocol (PDCP) is used which operates between the UE 30 and the eNB 10.

PDCP is one the layers of the radio traffic stack in 3GPP based networks and performs, amongst others, IP header compression and a transfer of user data. A PDCP header consists of two fields: PID for compression protocol type indication and PDU Type.

As an indication element used for the IP traffic flow identification/tagging, according to some examples of embodiments of the invention, certain PDU type codes are used. According to the PDCP specification, there are several unused PDU types which are usable for this purpose.

Presently, in the PDCP, two out of eight possible PDU types are commonly in use. Hence, according to some examples of embodiments of the invention, several further of the remaining PDU types are reserved for the multi-address bearer purposes. In detail, for example, according to some examples of embodiments of the invention, one PDU type is used for the eNB terminated/breakout traffic, and one other PDU type is used for the SGW terminated/breakout traffic. Furthermore, a PDU type is used, according to some examples of embodiments of the invention, for multicast traffic where the breakout connection is established at more than one element, e.g. at two or all three of the eNB, the SGW and the PGW. It is to be noted that for PGW only terminated traffic an existing PDCP PDU type number is used. By means of this, it is possible to be conservative on the E-RAB level.

According to some examples of embodiments of the invention, in case of a terminating point or breakout point at the SGW, one additional bearer pair, i.e. a S1-U and S1-MME bearer pair between the eNB 10 and the SGW 20 on one side and the eNB 10 and an MME on the other side, is required in order to represent the SGW terminated/breakout traffic. However, even in this case, a fair compromise is achieved with regard to the saved E-RAB consumption. Furthermore, it is to be noted that in case of a terminating point at the eNB, the rest of the packet core network can be kept unaware of the multi-address bearer activities on the eNB site. Thus, the overall signaling load can be reduced.

According to some examples of embodiments of the invention, the communication network control element, such as the eNB 10, is able to make traffic differentiation for local consumption (i.e. breakout at the eNB) or for forwarding to bearers heading to further network elements (i.e. no breakout at least at the eNB), such as to the PGW 40 and the SGW 20, entirely without an IP lookup. Furthermore, PDCP also implicitly differentiates between data and control packets, which is useful according to some examples of embodiments of the invention during the configuration of the multi-address bearer.

According to some examples of embodiments of the invention, a conceptual link-layer addressing is applied. Link-layer addressing facilitates the integration of IPv6 from the mobile device IP stack point of view, since IPv6 was designed to work best over multicast link with link-layer addressing.

According to some examples of embodiments of the invention, the indication element such as the PDCP PDU type codes (e.g. for data packets) are mapped to link-layer addresses.

According to some further examples of embodiments of the invention, a common conceptual link-layer addressing scheme is applied for a UE, an eNB, an SGW and a PGW.

It is to be noted that according to some examples of embodiments of the invention the link-layer addressing is not related to a real physical layer-2 address of each host on the multi-address link. The purpose of link layer addressing is to allow for an easier mapping of IP flows and IPv6 prefixes to the proper PDCP PDU types and radio level constructs. In other words, according to some examples of embodiments of the invention, the link-layer is a conceptual construct with a known name space where the address implicitly contains the information of the network node (e.g. eNB, SGW) where the traffic is to be terminated.

FIG. 2 shows a diagram illustrating an example of a link-layer address mapping to PDCP PDU types. Specifically, FIG. 2 shows, according to some examples of embodiments of the invention, a mapping of PDCP PDU types to EUI-64 identifiers.

In the left column of the table according to FIG. 2, examples for respective PDCP PDU type codes are listed (hexadecimal code). In the middle column, examples of EUI-64 identifiers are listed. That is, according to some examples of embodiments of the invention, the link-layer address is mapped into a reserved EUI-64 identifier. In the right column of the table, further explanations are indicated.

As can be seen in FIG. 2, a PDU type "000b" is assumed to represent the existing type for control PDUs, i.e. one of the already used types. Similarly, a PDU type "001b" is allocated to IP traffic to be terminated at the PGW (also referred to as PDU type 1), wherein the EUI-64 identifier mapped to this PDU type is optional.

On the other hand, PDU type "010b" is allocated to IP traffic to be terminated at the eNB (also referred to as PDU type 2). Similarly, PDU type "011b" is allocated to IP traffic to be terminated at the SGW (also referred to as PDU type 3).

Furthermore, the PDU type "100b" is allocated to an UL multicast traffic handling. That is, when the eNB 10 receives traffic using this PDU type "100b", for example, it knows that the IP packet inside the PDCP PDU is to be copied and forwarded also to connections towards the SGW 20 (if available) and the PGW 40. According to some examples of embodiments of the invention, whether the PDU type "100b" is used is a decision of the UE 30, since it can also do copying of the multicast packets to each receiver (eNB, SGW and PGW).

Remaining PDU types are kept for other purposes.

It is to be noted that in the EUI-64 identifiers indicated in FIG. 2 the OUI part (aa:bb:cc) (also referred to as "company_ID") is fictional. However, according to some examples of embodiments of the invention, a new OUI value is required for multi-address bearer EUI-64 purposes.

Figure 3:
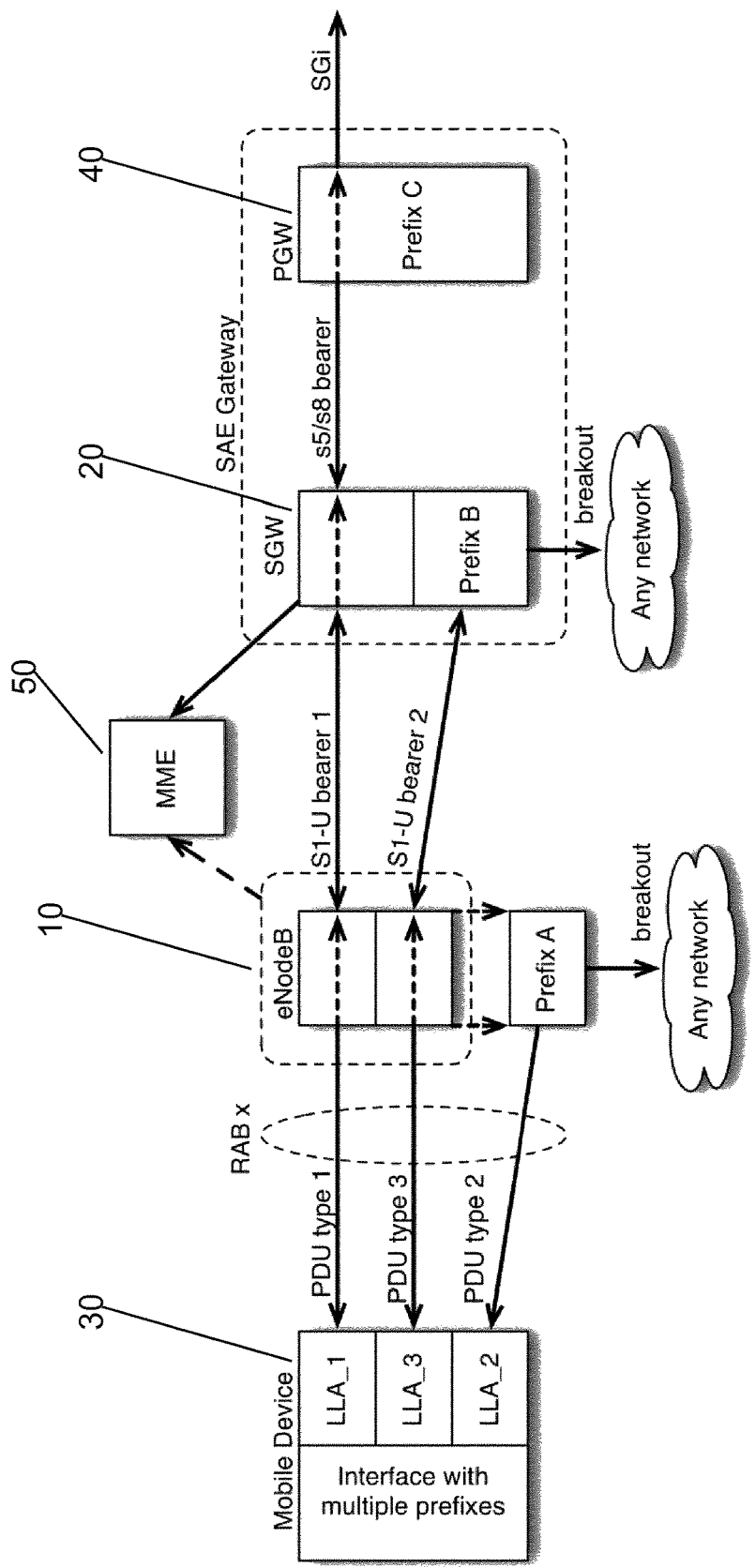
FIG. 3 shows a diagram illustrating further details of a communication network configurtion where some examples of embodiments of the invention are implemented.

FIG. 3 shows a diagram illustrating further details of a communication network configuration where some examples of embodiments of the invention are implemented. Specifically, FIG. 3 illustrates the results of the procedures related to the mapping of the PDU types, the different bearers and the conceptual link-layer addresses (i.e. LLAs) as described above. The LLAs are "conceptual" in a sense that they are just for easing the internal operations of the IP stack in the UE. According to some examples of embodiments of the invention, the LLAs are not physically installed on any device since 3GPP link model (old and the new one) does not have real physical link-layer addresses.

As described also in connection with FIG. 1, the communication connection via the multi-address bearer is established between the UE 30 and the network. According to some examples of embodiments of the invention, the UE 30 (mobile device) has an interface with multiple prefixes, wherein in the illustrated example three LLAs 1 to 3 are provided. That is, according to some examples of embodiments of the invention, a multi-address bearer is shown inside the UE as an internal interface with multiple prefix. Alternatively, according to some further examples of embodiments of the invention, each prefix (i.e. breakout point or LLA_x according to FIG. 3) is presented as an individual interface inside the UE.

The eNB 10 forms the access node to the communication network, wherein the connection to the UE 30 is provided via a (single) E-RAB (RABx in FIG. 3). An IP based link using a prefix A and mapped on PDU type code 2, which is mapped to LLA 2, is broken out at the eNB 10, that is the eNB 10 is terminating point for the breakout connection of the IP link based on prefix A.

The SGW 20 is connected to the eNB 10 via respective S1-U bearers. An IP based link using a prefix B and mapped on PDU type code 3 which is mapped to LLA 3 is broken out at the SGW 20, that is the SGW 20 is terminating point for the breakout connection of the IP link based on prefix B. As indicated Furthermore, an MME 50 is shown which is connected to the eNB 10 via an S1 MME interface, and to the SGW 20 via an S11 interface. As described above, for the SGW terminated traffic based on prefix B (breakout connection), a corresponding bearer pair (S1-U bearer 2 and S1 MME) is to be established according to some examples of embodiments of the invention.

Furthermore, the PGW 40 is connected to the SGW 20 via respective S5/S8 bearers. An IP based link using a prefix C and mapped on PDU type code 1 which is mapped to LLA 3 is formed via the SGW 20 e.g. according to standard procedure.

According to some examples of embodiments of the invention, the multi-address bearer indicated in FIGS. 1 and 3 is modeled as an isolated per mobile device link. That is, according to some examples of embodiments of the invention, there is only one end host attached to the multi-address link in addition to routers. According to some further examples of embodiments of the invention, however, the end host (i.e. the UE) shares the addresses from the multi-address link to another network, for example a local area network (i.e. performs a procedure known as tethering).

According to some examples of embodiments of the invention, as indicated in FIG. 3, the SGW and PGW entities are combined into a so-called SAE gateway node. In such a deployment case, the terminating or breakout point to be formed by the SGW functionality and the router is in the same place as the PGW. However, by using the connection establishment procedure according to some examples of embodiments of the invention using the multi-address bearer and an indication that the SGW shall form a terminating point for the breakout connection, a difference is the mobility management is provided. That is, the IPv6 prefix provided via the "SGW router" does not provide mobility or any other features that are typically associated with a 3GPP PDN Connections and EPS bearer, such as policy control. It is just for a plain simple IP use.

It is to be noted that according to some examples of embodiments of the invention it is possible for the operator to configure the communication in such a manner that not only one but both of the eNB 10 and the SGW 20 are used as terminating or breakout points. That is, according to some examples of embodiments of the invention, it is possible to configure the system in such a manner that one of the following breakout combinations is arranged: PGW only, eNB+PGW, eNB+SGW+PGW and SGW+PGW.

It is to be noted that the handling of IPv6 prefixes that are terminated at the eNB 10 for example do not need to be communicated to the MME for their multi-address bearer handling. They are entirely local to the eNB. Thus, the processing load for the network, e.g. in the MME, can be reduced.

Furthermore, it is to be noted that according to some examples of embodiments of the invention, during a handover (e.g. an SGW and/or eNB change), only the PGW anchored prefix (prefix C in FIG. 3) is guaranteed to remain the same. Both eNB and SGW anchored prefixes (prefixes A and B) may change when the network element changes.

Figure 4:
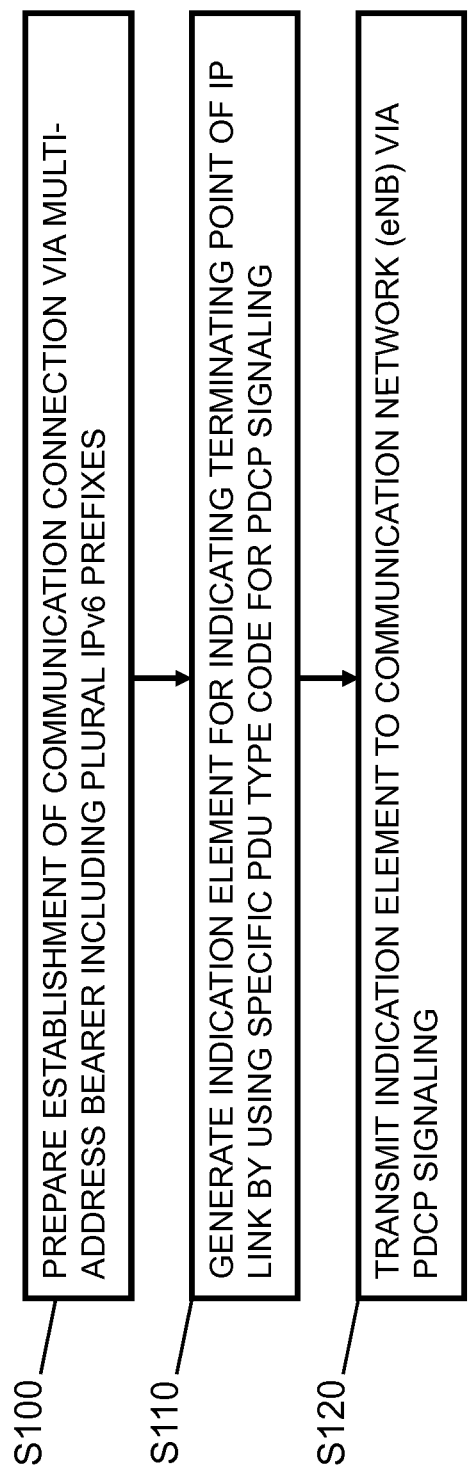
FIG. 4 shows a flowchart illustrating a processing executed in a communication element according to examples of embodiments of the invention.

FIG. 4 shows a flowchart illustrating a processing executed in a communication element like the UE 30 of FIG. 1 according to some examples of embodiments of the invention in a communication establishment mechanism as described above.

In step S100, the establishment of a communication connection to a cellular communication network via a multi-address bearer connection is prepared. As indicted above, the communication connection is provided with multiple addresses for IP based communication links, such as IPv6 links, wherein the addresses are IPv6 prefixes.

In step S110, an indication element for indicating at least one terminating point or breakout point, i.e. a corresponding network element of the cellular communication network is generated. At the terminating point, based on one of the multiple addresses, data traffic is branched to another network e.g. the Internet or a local network by means of one of the IP based communication links. For the indication element, according to some examples of embodiments of the invention, a specific PDU type code of a convergence protocol signaling, such as a PDCP signaling is used. The specific PDU type code is allocated to a certain network element (e.g. eNB, SGW) being the terminating point. The generation of the indication element further comprises, according to some examples of embodiments of the invention, a mapping of the PDU type code element to a link layer address allocated to one of the IP based communication links. According to some further examples of embodiments of the invention, a common link layer addressing is applied for each network element involved in the communication connection via the multi-address bearer connection. Moreover, according to some examples of embodiments of the invention, the link layer address to which the PDU type code is mapped is mapped to a reserved EUI-64 identifier.

According to some further examples of embodiments of the invention, for the generation of the indication element, information indicating a preferred terminating point for a data communication using the IP based communication links are received and considered. According to some examples of embodiments of the invention, the information indicating the preferred terminating point is derived from a user input via a UI providing selection options for entering an instruction indicating the preferred terminating point. Alternatively, according to some further examples of embodiments of the invention, the information is provided by the network, for example by using an IP based signaling, e.g. an IPv6 neighbor discovery protocol.

In step S120, the transmission of the indication element by means of a convergence protocol signaling, e.g. the PDCP signaling, to a communication network control element of the cellular communication network, like the eNB 10, is caused.

Figure 5:
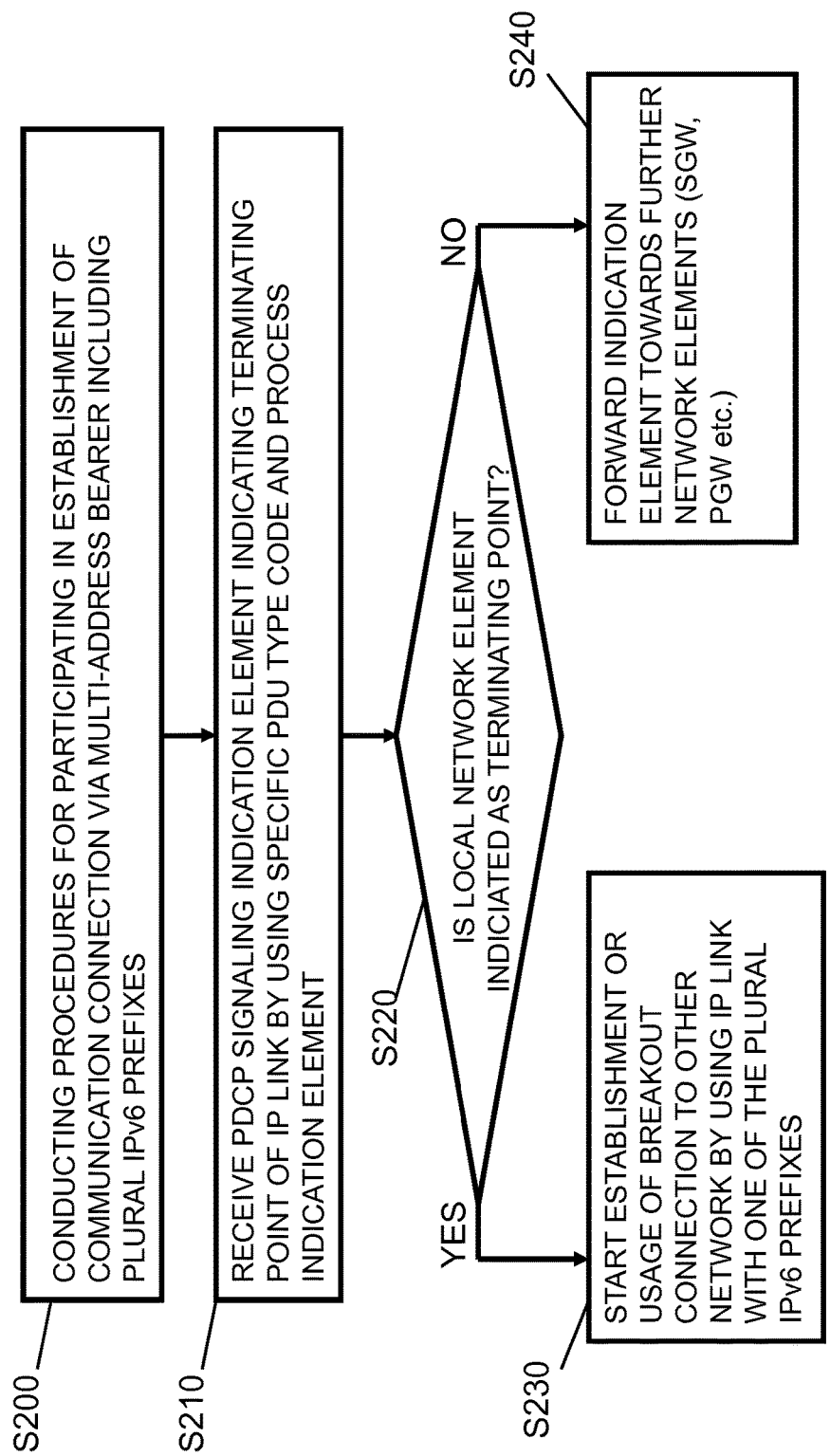
FIG. 5 shows a flowchart illustrating a processing executed in a communication network control element according to examples of embodiments of the invention.

FIG. 5 shows a flowchart illustrating a processing executed in a communication network control element like the eNB 10 of FIG. 1 according to examples of embodiments of the invention in a communication establishment mechanism as described above. It is to be noted that a similar processing is conducted, according to some examples of embodiments of the invention, also in a CN network element being usable as a terminating point, such as the SGW 20.

In step S200, procedures regarding a participation in an establishment of a communication connection in a cellular communication network via a multi-address bearer connection to a UE are executed. As described above, the communication connection is provided with multiple addresses for IP based communication links, such as IPv6 links, wherein the addresses are IPv6 prefixes.

In step S210, an indication element is received by means of a convergence protocol signaling, wherein the indication element indicates according to some examples of embodiments of the invention at least one terminating point in the form of a network element of the cellular communication network where data traffic, based on one of the multiple addresses, is branched or broken out to another network, such as the Internet, by means of one of the IP based communication links.

According to some examples of embodiments of the invention, the convergence protocol is PDCP, wherein the indication element is a PDU type code allocated to each possible network element (eNB, SGW) being the terminating point of the IP based communication links.

As described above, according to some examples of embodiments of the invention, the PDU type code is mapped to a link layer address allocated to one of the IP based communication links, or according to some other examples of embodiments of the invention a common conceptual link-layer addressing is used for each network element involved in the communication connection via the multi-address bearer connection. Furthermore, according to some examples of embodiments of the invention, the conceptual link-layer address, to which the PDU type code is mapped, is mapped to a reserved EUI-64 identifier.

In step S220, it is decided on the basis of the processing of the indication element whether the local network element (i.e. the network element in which the processing is conducted, such as the eNB or the SGW) is indicated as a terminating point.

If the decision in step S220 is positive, the process proceeds to step S230, where a communication via the breakout connection is started. According to some examples of embodiments of the invention, in step S230, a breakout connection to another network by an IP based communication link using the corresponding address (IPv6 prefix) is established. According to some further examples of embodiments of the invention, the eNB/SGW has established the breakout connection beforehand and indicated the availability of the breakout to the UE via a suitable signaling, e.g. via Router Advertisement.

Otherwise, if the decision in step S220 is negative or a multicast traffic is indicated, the process proceeds to step S240 where forwarding of the indication element to a next network element (e.g. SGW or PGW) is caused.

Figure 6:
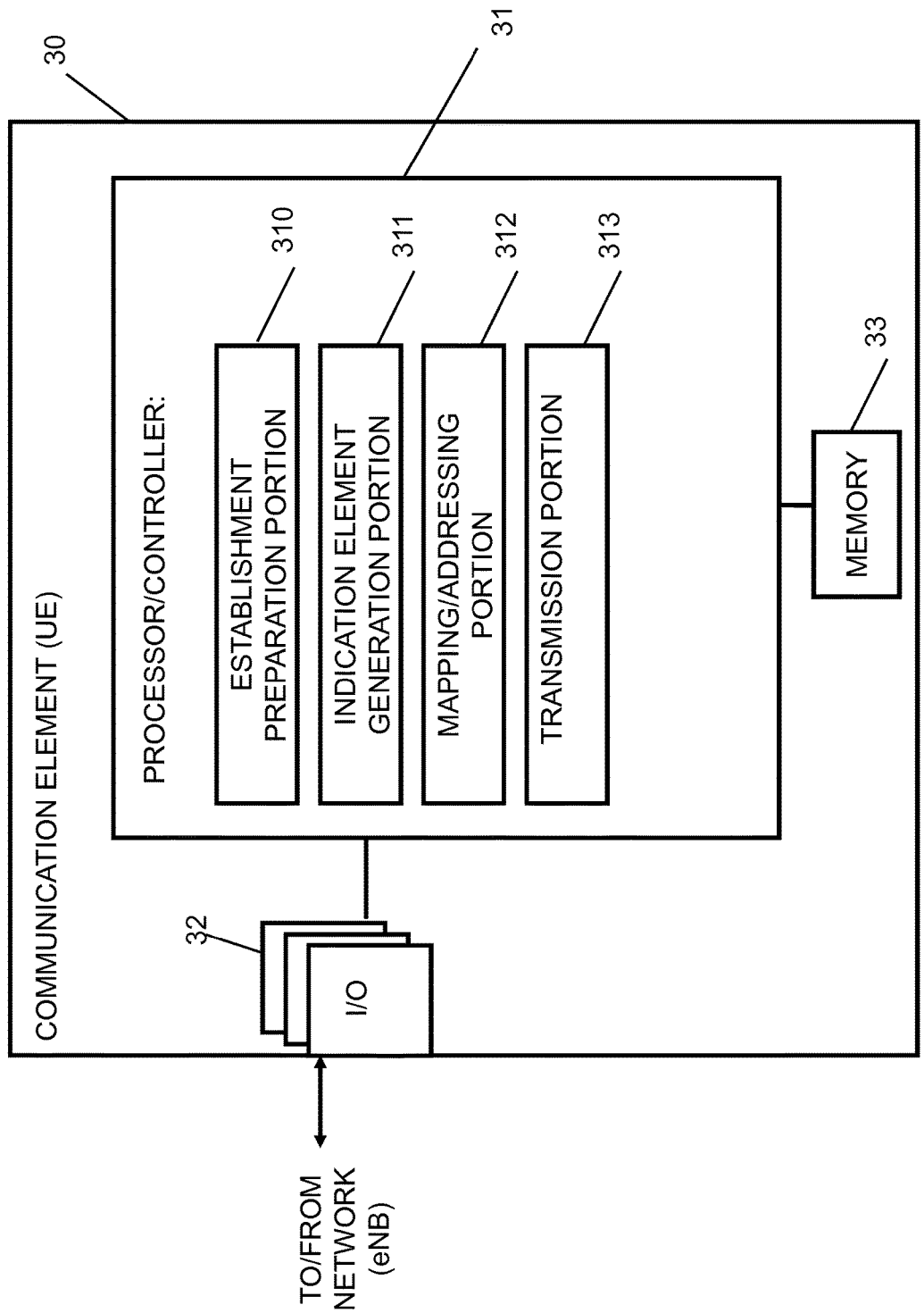
FIG. 6 shows a block circuit diagram of a communication element including processing portions conducting functions according to examples of embodiments of the invention.

In FIG. 6, a block circuit diagram illustrating a configuration of a communication element, such as of UE 30, is shown, which is configured to implement the communication establishment mechanism as described in connection with the examples of embodiments of the invention. It is to be noted that the communication element or UE 30 shown in FIG. 6 may comprise several further elements or functions besides those described herein below, which are omitted herein for the sake of simplicity as they are not essential for understanding the invention. Furthermore, even though reference is made to a UE (or terminal device), the communication element may be also another device having a similar function, such as a chipset, a chip, a module etc., which can also be part of a UE or attached as a separate element to a UE, or the like.

The communication element or UE 30 may comprise a processing function or processor 31, such as a CPU or the like, which executes instructions given by programs or the like related to the communication establishment mechanism. The processor 31 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 32 denotes transceiver or input/output (I/O) units (interfaces) connected to the processor 31. The I/O units 32 may be used for communicating with one or more communication network control elements like the eNB 10, and with a communication network such as a WLAN, a IEEE 802.15.4 based network, a ZigBee network, Bluetooth, wired USB and Ethernet, and the like. The I/O units 32 may be a combined unit comprising communication equipment towards several network elements, or may comprise a distributed structure with a plurality of different interfaces for different network elements. Reference sign 33 denotes a memory usable, for example, for storing data and programs to be executed by the processor 31 and/or as a working storage of the processor 31.

The processor 31 is configured to execute processing related to the above described communication establishment mechanism. In particular, the processor 31 comprises a sub-portion 310 as a processing portion which is usable for conducting a processing for preparing the establishment of a connection via a multi-address bearer. The portion 310 may be configured to perform a processing according to step S100 of FIG. 4, for example. Furthermore, the processor 31 comprises a sub-portion 311 usable as a portion for generating an indication element related to the terminating point. The portion 311 may be configured to perform processing according to step S110 of FIG. 4, for example. Furthermore, the processor 31 comprises a sub-portion 312 usable as a portion for conducting mapping and/or addressing. The portion 312 may be configured to perform processing related to the mapping described with regard to FIG. 2, for example. In addition, the processor 31 comprises a sub-portion 313 as a processing portion which is usable for causing transmission of the indication element, e.g. via a PDCP signaling, to the network. The portion 313 may be configured to perform processing according to step S120 of FIG. 4, for example.

Figure 7:
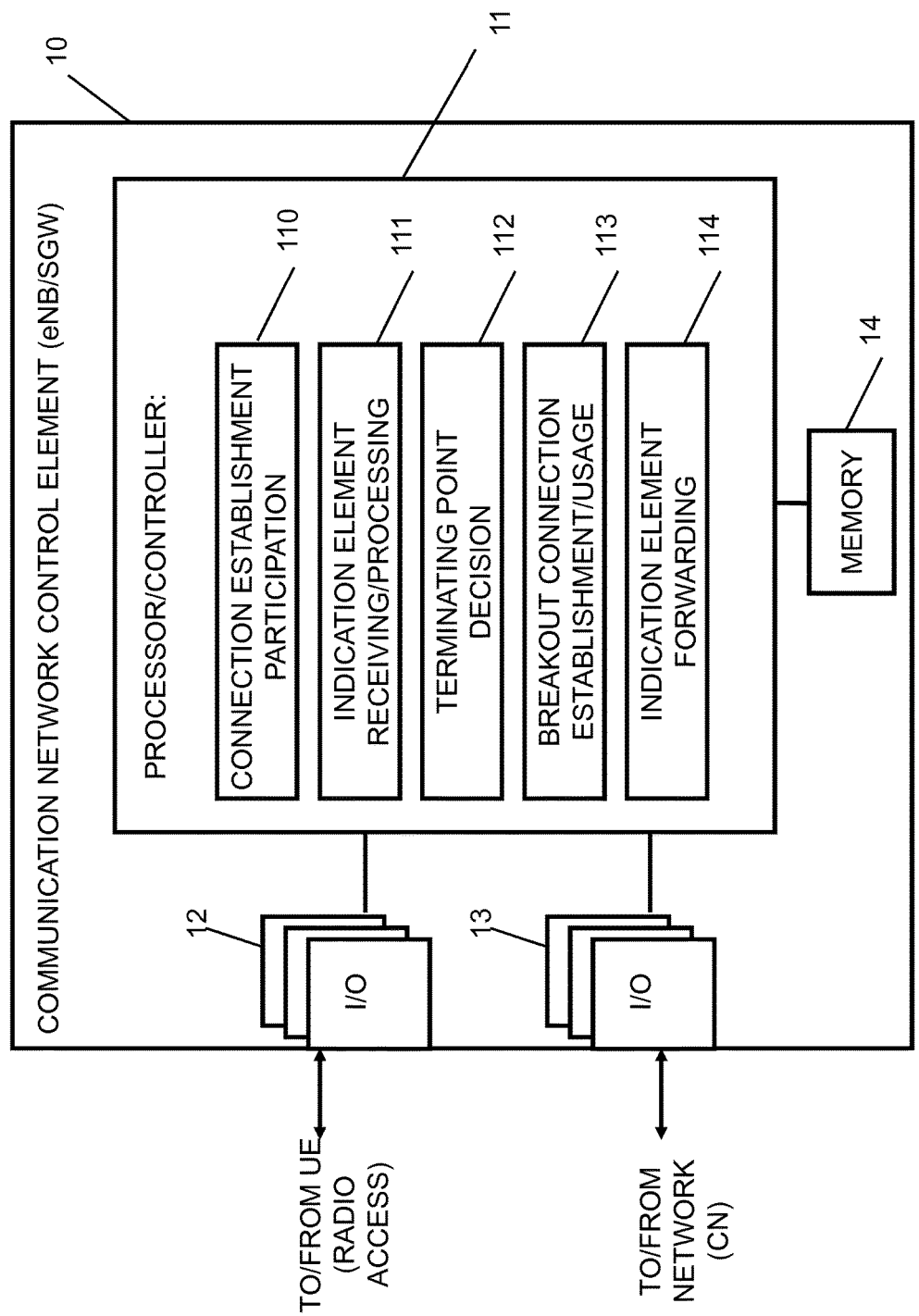
FIG. 7 shows a block circuit diagram of a communication network control element including processing portions conducting functions according to examples of embodiments of the invention.

In FIG. 7, a block circuit diagram illustrating a configuration of a communication network control element, such as of eNB 10, is shown, which is configured to implement the communication establishment mechanism as described in connection with the examples of embodiments of the invention. It is to be noted that the structure shown in FIG. 7 is basically also applicable for a core network control element, such as the SGW 20, which is able to conduct a similar processing with regard to the communication establishment procedure when receiving an indication as described above. It is to be further noted that the communication network control element or eNB 10 (or SGW 20) shown in FIG. 7 may comprise several further elements or functions besides those described herein below, which are omitted herein for the sake of simplicity as they are not essential for understanding the invention. Furthermore, even though reference is made e.g. to an eNB, the communication network control element may be also another device having a similar function, such as a chipset, a chip, a module etc., which can also be part of a control element or eNB or attached as a separate element to a control element like an eNB, or the like.

The communication network control element or eNB 10 (or SGW 20) may comprise a processing function or processor 11, such as a CPU or the like, which executes instructions given by programs or the like related to the flow control mechanism. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 12 and 13 denote transceiver or input/output (I/O) units (interfaces) connected to the processor 11. The I/O units 12 may be used for communicating towards a radio access for one or more communication elements like UEs, or to a corresponding network element like an eNB (in case of the SGW 20, for example). The I/O units 12 may be used for communicating with one or more core network control elements like the SGW 20 (in case of the eNB 10) or the PGW 40 (in case of the SGW 20). The I/O units 12 and 13 may be a combined unit comprising communication equipment towards several network elements, or may comprise a distributed structure with a plurality of different interfaces for different network elements. Reference sign 14 denotes a memory usable, for example, for storing data and programs to be executed by the processor 11 and/or as a working storage of the processor 11.

The processor 11 is configured to execute processing related to the above described communication establishment mechanism. In particular, the processor 11 comprises a sub-portion 110 as a processing portion which is usable for conducting procedures related to a participation in the establishment of a communication connection via a multi-address bearer. The portion 110 may be configured to perform processing according to step S200 of FIG. 5, for example. Furthermore, the processor 11 comprises a sub-portion 111 usable as a portion for receiving and processing an indication element indicating a terminating point. The portion 111 may be configured to perform processing according to step S210 of FIG. 5, for example. Furthermore, the processor 11 comprises a sub-portion 112 usable as a portion for deciding whether or not the local network element is a terminating point. The portion 112 may be configured to perform processing according to step S230 of FIG. 5, for example. In addition, the processor 11 comprises a sub-portion 113 as a processing portion which is usable for starting communication via a breakout connection (i.e. establishment of breakout connection or usage of established breakout connection). The portion 113 may be configured to perform processing according to step S240 of FIG. 5, for example. In addition, the processor 11 comprises a sub-portion 114 usable as a portion for causing to forward the indication element to the next CN network element. The portion 114 may be configured to perform processing according to step S250 of FIG. 5, for example.

As indicated above, according to some examples of embodiments of the invention, by means of the above described procedures and devices, it is possible to provide a mechanism for establishing a communication connection via a multi-address bearer with plural Ipv6 prefixes. In this mechanism, according to some examples of embodiments of the invention, backward compatibility is ensured since IPv4 links and dedicated bearers can continue working, for example as a connection conducted between UE and PGW. According to some further examples of embodiments of the invention, the eNB and the UE are configured to silently discards unknown PDCP PDU types, which makes the backward compatibility against the existing system even simpler to achieve. Furthermore, according to some examples of embodiments of the invention use the EUI-64 link-layer address in a mapping scheme so that so-called split-UE scenarios, such as USB dongles, MiFi (My-WiFi) equipment, or even for implementations where a handset is internally architectured as split-UE (separated mobile terminal and terminal equipment) are suitably supported. Moreover, on the network side, in particular in the eNB, an efficient traffic identification and separation is possible according to some examples of embodiments of the invention, since an identification/categorization of the connection to be established into one where a breakout connection is to be established at the eNB or one which concerns another network element can be done with minimal load using predefined PDCP PDU types (no IP lookup or IP inspection is required). Also the load for the remaining network elements (i.e. elements being not the local terminating point, such as the PGW) can be kept small according to some examples of embodiments of the invention, since the breakout IP link is local to e.g. the eNB. Also in case a breakout connection is to be established at the SGW site, i.e. there is a local IPv6 prefix at the SGW, the load for the system can be kept small according to some examples of embodiments of the invention, since the burden of PCC and other handover signaling can be avoided. Furthermore, it is possible to flexibly configure the system. For example, according to some examples of embodiments of the invention, an operator can decide which network element is to be preferred as a terminating point for a breakout connection. Thus, it is possible, for example, to give the eNB priority compared to other elements (e.g. for traffic offloading reasons), or to determine that an SGW provided local addressing is not to be used.

For example, according to some examples of embodiments of the invention, network operators can easily utilize mechanisms, such as one being based on IETF RFC4191, to choose which of network element, e.g. which of the three entities eNB, SGW, PGW is to be used as default gateway for an IP based link. For example, the operator can configure the eNB 10 to be high priority default gateway, the SGW 20 to be mid-priority default gateway, and the PGW 40 to be low-priority default gateway. By means of providing this information to the UE 30, according to some examples of embodiments of the invention, it is possible to instruct the UE 30 which route is to be used for default traffic.

According to some examples of embodiments of the invention, a UI of the UE comprises a setting option for the user to select a preferred terminating point. That is, according to some examples of embodiments of the invention, for handsets usability reasons, a network management UI provides user control possibility for the breakouts. For example, the UI shows the user could a typical cellular connection selection menu or the like which, as one setting option (which can be the default setting option), maps to a connection to the PGW 40. In addition, there are provided sub-selection options for allowing/disallowing a breakout to occur at another terminating point, i.e. the eNB or the SGW, wherein according to further examples of embodiments of the invention a IP based link from the PGW can be allowed/disallowed. The selection can be also provided by options like "Short range cellular data" (for eNB breakout), "Mid-range cellular data" (for SGW breakout), or the like.

Furthermore, according to some examples of embodiments of the invention, instead of using one address such as an IPv6 prefix per breakout or terminating point, multiple addresses such as multiple IPv6 prefixes per breakout or terminating point are used.

According to further examples of embodiments of the invention, there is provided an apparatus comprising establishment preparation means for preparing the establishment of a communication connection to a cellular communication network via a multi-address bearer connection, the communication connection is provided with multiple addresses for Internet protocol based communication links, indication generation means for generating an indication element for indicating at least one terminating point represented by a network element of the cellular communication network where data traffic, based on at least one of the multiple addresses, is branched to another network being different to the cellular communication network by means of one of the Internet protocol based communication links, and transmission means for causing transmission of the indication element by means of a convergence protocol signaling to a communication network control element of the cellular communication network.

Moreover, to further examples of embodiments of the invention, there is provided an apparatus comprising processing means for conducting a processing for participating in an establishment of a communication connection in a cellular communication network via a multi-address bearer connection to a communication element, the communication connection is provided with multiple addresses for Internet protocol based communication links, indication receiving means for receiving, by means of a convergence protocol signaling, and processing an indication element for indicating at least one terminating point represented by a network element of the cellular communication network where data traffic, based on at least one of the multiple addresses, is branched to another network being different to the cellular communication network by means of one of the Internet protocol based communication links, and decision means for deciding on the basis of the processing of the indication element whether a local network element is indicated as a terminating point.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element (station) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is provided a mechanism for establishing a single PDN connection with plural IP addresses and breakout or terminating points. When a communication connection provided with multiple IP addresses via a multi-address bearer connection is established, an indication is prepared for indicating a terminating point represented by a network element of the cellular communication network where data traffic, based on one of the multiple IP addresses, is branched to another network being different to the cellular communication network by means of an IP based communication link. The indication element is sent to the communication network by means of a PDCP signaling e.g. as a new PDU type code. In the network, it is decided whether a local receiving network element is indicated as a terminating point, wherein in this case a breakout connection to another network being different to the cellular communication network by the IP based communication link is established.

Although the present invention has been described herein before with reference to particular embodiments thereof, the present invention is not limited thereto and various modifications can be made thereto.

The invention claimed is:

1. A method, comprising:

preparing establishment of a single communication connection to a cellular communication network via a multi-internet protocol version 6 (IPv6) bearer connection, the single communication connection is provided with multiple IPv6 prefixes for Internet protocol based communication links;

generating a forward action rule indication element for indicating at least one terminating point represented by a network element of the cellular communication network where data traffic, based on at least one of the multiple IPv6 prefixes, is branched to another network, which is different than the cellular communication network, via one of the Internet protocol based communication links, wherein the forward action rule indication element is included in a packet forwarding control protocol message; and causing transmission of the forward action rule indication element via a packet forwarding control protocol signaling to a communication network control element of the cellular communication network, wherein the packet forwarding control protocol is a packet data convergence protocol used between a communication element and the communication network control element, and the forward action rule indication element is a packet data unit type code element, wherein a specific packet data unit type code element is allocated to the network element representing the at least one terminating point of the Internet protocol based communication links on a side of the cellular communication network.

2. The method according to claim 1, further comprising:
mapping the packet data unit type code element to a link layer address allocated to one of the Internet protocol based communication links, or
using a common link layer addressing for the network element involved in the single communication connection via the multi-IPv6 bearer connection.

3. The method according to claim 2, further comprising:
mapping the link layer address to which the packet data unit type code is mapped to a reserved extended unique identifier.

4. The method according to claim 1, further comprising:
receiving information indicating a preferred one of the at least one terminating point, represented by the network element, for a data communication using the Internet protocol based communication links,
wherein the preferred one of the at least one terminating point, represented by the network element, is considered in the generating of the forward action rule indication element.

5. The method according to claim 4, further comprising at least one of:
deriving the information indicating the preferred one of the at least one terminating point, represented by the network element, from a user input via a user interface providing selection options for entering an instruction indicating the preferred one of the at least one terminating point; and
receiving the information indicating the preferred one of the at least one terminating point from the cellular communication network via an Internet protocol based signaling.

6. The method according to claim 1, wherein the method is implemented in a communication element comprising at least one of a terminal device or user equipment which is located in the cellular communication network and which communicates with the communication network control element of the cellular communication network, wherein the communication network control element comprises at least one of a base station of the cellular communication network, or an evolved node B of a Long Term Evolution or Long Term Evolution Advanced communication network.

7. An apparatus comprising
at least one processor,
at least one interface to at least one other network element, and
at least one memory for storing instructions to be executed by the processor, wherein
the at least one memory and the instructions are configured to, with the at least one processor, cause the apparatus at least to:
prepare establishment of a single communication connection to a cellular communication network via a multi-internet protocol version 6 (IPv6) bearer connection, the single communication connection is provided with multiple IPv6 prefixes for Internet protocol based communication links;
generate a forward action rule indication element for indicating at least one terminating point represented by a network element of the cellular communication network where data traffic, based on at least one of the multiple IPv6 prefixes, is branched to another network, which is different than the cellular communication network, via one of the Internet protocol based communication links, wherein the forward action rule indication element is included in a packet forwarding control protocol message; and
cause transmission of the forward action rule indication element by via a packet forwarding control protocol signaling to a communication network control element of the cellular communication network,
wherein the transmission function is further configured to cause the transmission of the forward action rule indication element by a packet data convergence protocol signaling between a communication element and the communication network control element, and wherein the forward action rule indication generation function is further configured to generate the forward action rule indication element in the form of a packet data unit type code element, wherein a specific packet data unit type code element is allocated to the network element representing the at least one terminating point of the Internet protocol based communication links on a side of the cellular communication network.

8. The apparatus according to claim 7, wherein the at least one memory and the instructions are further configured to, with the at least one processor, cause the apparatus at least to perform:
map the packet data unit type code element to a link layer address allocated to one of the Internet protocol based communication links, or
use a common link layer addressing for the network element involved in the single communication connection via the multi-IPv6 bearer connection.

9. The apparatus according to claim 8, wherein the mapping function is further configured to map the link layer address to which the packet data unit type code is mapped to a reserved extended unique identifier.

10. The apparatus according to claim 7, wherein the at least one memory and the instructions are further configured to, with the at least one processor, cause the apparatus at least to:
receive an information indicating a preferred one of the at least one terminating point, represented by the network element, for a data communication using the Internet protocol based communication links, and
use the preferred one of the at least one terminating point, represented by the network element, in the generation of the forward action rule indication element.

11. The apparatus according to claim 10, wherein the at least one memory and the instructions are further configured to, with the at least one processor, cause the apparatus at least to: derive the information indicating the preferred one of the at least one terminating point, represented by the network element, from a user input via a user interface providing selection options for entering an instruction indicating the preferred one of the at least one terminating point, and receive the information indicating the preferred one of the at least one terminating point from the cellular communication network via an Internet protocol based signaling.

12. The apparatus according to claim 7, wherein the apparatus is implemented in a communication element comprising at least one of a terminal device or user equipment which is located in the cellular communication network and which communicates with the communication network control element of the cellular communication network, wherein the communication network control element comprises at least one of a base station of the cellular communication network, or an evolved node B of a Long Term Evolution or Long Term Evolution Advanced communication network.

13. A method, comprising:
participating in an establishment of a single communication connection in a cellular communication network via a multi-internet protocol version 6 (IPv6) bearer connection to a communication element, the single communication connection is provided with multiple IPv6 prefixes for Internet protocol based communication links;
receiving at a communication network control element, via a packet forwarding control protocol signaling, and processing a forward action rule indication element for indicating at least one terminating point represented by a network element of the cellular communication network where data traffic, based on at least one of the IPv6 prefixes, is branched to another network, which is different than the cellular communication network, via one of the Internet protocol based communication links, wherein the forward action rule indication element is included in a packet forwarding control protocol message; and
deciding at the communication network control element on the basis of the processing of the forward action rule indication element whether the network element is indicated as the at least one terminating point,
wherein the packet forwarding control protocol is a packet data convergence protocol used between a communication element and the communication network control element, and the forward action rule indication element is a packet data unit type code element, wherein a specific packet data unit type code element is allocated to of the network element representing the at least one terminating point of the Internet protocol based communication links on a side of the cellular communication network.

14. The method according to claim 13, further comprising:
if the decision results in the network element being indicated as the at least one terminating point, causing establishment of a breakout connection or usage of established breakout connection to the another network being different to the cellular communication network by one of the Internet protocol based communication links using one of the multiple IPv6 prefixes, and
if the decision results in that the network element is not indicated as the at least one terminating point or a multicast traffic is indicated, causing forwarding of the forward action rule indication element to the network element of the communication network.

15. The method according to claim 13, wherein the packet data unit type code element is mapped to a link layer address allocated to one of the Internet protocol based communication links, or a common link layer addressing is used for the network element involved in the single communication connection via the multi-IPv6 bearer connection.

16. The method according to claim 15, wherein the link layer address, to which the packet data unit type code is mapped, is mapped to a reserved extended unique identifier.

17. The method according to claim 13, further comprising:
causing transmission of information to the network element indicating the preferred at least one terminating point for a data communication using the Internet protocol based communication links.

18. The method according to claim 13, wherein the method is implemented in at least one of the communication network control element comprising at least one of a base station of the cellular communication network, or an evolved node B of a Long Term Evolution or Long Term Evolution Advanced communication network, and wherein a communication element comprises at least one of a terminal device or user equipment which is located in the cellular communication network and which communicates with the communication network control element of the cellular communication network.

19. An apparatus comprising
at least one processor,
at least one interface to at least one other network element, and
at least one memory for storing instructions to be executed by the processor, wherein
the at least one memory and the instructions are configured to, with the at least one processor, cause the apparatus at least to:
conduct processing for participating in an establishment of a single communication connection in a cellular communication network via a multi-internet protocol version 6 (IPv6)bearer connection to a communication element, the single communication connection is provided with multiple IPv6 prefixes for Internet protocol based communication links;
receive, via packet forwarding control protocol, and process a forward action rule indication element for indicating at least one terminating point represented by a network element of the cellular communication network where data traffic, based on at least one of the IPv6 prefixes, is branched to another network, which is different than the cellular communication network, via one of the Internet protocol based communication links, wherein the forward action rule indication element is included in a packet forwarding control protocol message; and
decide on the basis of the processing of the forward action rule indication element whether the network element is indicated as the at least one terminating point,
wherein the indication receiving function is further configured to receive the convergence protocol signaling as a packet data in the packet forwarding control protocol signaling used between a communication element and the apparatus, wherein the forward action rule indication element is a packet data unit type code element, wherein a specific packet data unit type code element is allocated to of the network element representing the at least one terminating point of the Internet protocol based communication links on a side of the cellular communication network.

20. The apparatus according to claim 19, further comprising:

if the decision results in the network element being indicated as the at least one terminating point, to cause establishment of a breakout connection or usage of established breakout connection to the another network being different to the cellular communication network by one of the Internet protocol based communication links using one of the IPv6 prefixes, and if the decision results in that the network element is not indicated as the at least one terminating point or a multicast traffic is indicated, to cause forwarding of the forwarding action rule indication element to the network element of the communication network.

21. The apparatus according to claim 19, wherein the packet data unit type code element is mapped to a link layer address allocated to one of the Internet protocol based communication links, or a common link layer addressing is used for the network element involved in the single communication connection via the multi-IPv6 bearer connection.

22. The apparatus according to claim 21, wherein the link layer address, to which the packet data unit type code is mapped, is mapped to a reserved extended unique identifier.

23. The apparatus according to claim 19, wherein the at least one memory and the instructions are further configured to, with the at least one processor, cause the apparatus at least to:

cause transmission of information to the network element indicating a preferred at least one terminating point for a data communication using the Internet protocol based communication links.

24. The apparatus according to claim 19, wherein the apparatus is implemented in at least one of a communication network control element comprising at least one of a base station of the cellular communication network, or an evolved node B of a Long Term Evolution or Long Term Evolution Advanced communication network, and wherein a communication element comprises at least one of a terminal device or user equipment which is located in the cellular communication network and which communicates with the communication network control element of the cellular communication network.

25. A computer program product embodied on a non-transitory computer-readable medium, said computer-readable medium comprising software code portions for performing the steps of claim 1, wherein said software code portions are run on a computer.

26. The computer program product according to claim 25, wherein the computer program product is directly loadable into an internal memory of the computer and/or transmittable via a network by means of at least one of an upload, a download, or a push procedure.

* * * * *